United States Patent [19]

Moore, III et al.

[11] Patent Number: 4,514,243
[45] Date of Patent: Apr. 30, 1985

[54] TIRE FOR WHEELCHAIRS AND THE LIKE

[75] Inventors: Dan T. Moore, III; Michael F. Fischer, both of Cleveland Heights, Ohio

[73] Assignee: Dan T. Moore Co., Cleveland, Ohio

[21] Appl. No.: 396,694

[22] Filed: Jul. 9, 1982

[51] Int. Cl.³ .......................... B29H 11/00; B60C 7/12
[52] U.S. Cl. ...................................... 156/113; 156/122; 156/158; 156/272.4; 156/244.12; 156/244.13; 156/244.18; 156/304.3; 156/304.6; 264/25; 264/150; 264/173; 264/248; 425/174.8 R; 152/311; 152/327; 152/329
[58] Field of Search ...................... 156/112, 91, 306.6, 156/113, 272.4, 122, 309.3, 244.12, 244.13, 244.18, 304.1, 304.2, 304.3, 304.6, 158; 264/173, 150, 25, 248; 425/174.8 E, 174.8 R; 152/310, 311, 312, 318, 323-329, 313, 319-322

[56] References Cited

U.S. PATENT DOCUMENTS

| | | | |
|---|---|---|---|
| 3,561,493 | 2/1971 | Maillard | 156/244.13 |
| 3,612,803 | 10/1971 | Klaas | 156/272.4 |
| 3,994,644 | 11/1976 | Hegler et al. | 264/173 |
| 4,033,395 | 7/1977 | Berg et al. | 152/323 |
| 4,127,166 | 11/1978 | Wyman | 152/323 |
| 4,273,176 | 6/1981 | Wyman et al. | 152/324 |
| 4,324,279 | 4/1982 | McFarlane | 152/314 |
| 4,341,509 | 7/1982 | Harlow | 425/114 |

FOREIGN PATENT DOCUMENTS

| | | | |
|---|---|---|---|
| 2136656 | 2/1973 | Fed. Rep. of Germany | 156/158 |
| 1405628 | 5/1965 | France | 156/272.4 |
| 178821 | 11/1982 | Japan | 156/272.4 |
| 6600718 | 7/1966 | Netherlands | 156/244.13 |
| 166152 | 7/1921 | United Kingdom | 156/113 |
| 0657703 | 9/1951 | United Kingdom | 156/272.4 |
| 1043071 | 9/1966 | United Kingdom | 156/272.4 |

Primary Examiner—Lois E. Boland
Attorney, Agent, or Firm—Pearne, Gordon, Sessions, McCoy, Granger & Tilberry

[57] ABSTRACT

A tire for a wheelchair wheel or the like in the form of a composite extrusion comprising a relatively soft, elastomeric casing extruded over a semirigid core. End faces of a length of extruded stock are joined by thermal fusion developed by a ferromagnetic element inserted in the tire and exposed to high frequency electromagnetic radiation.

2 Claims, 6 Drawing Figures

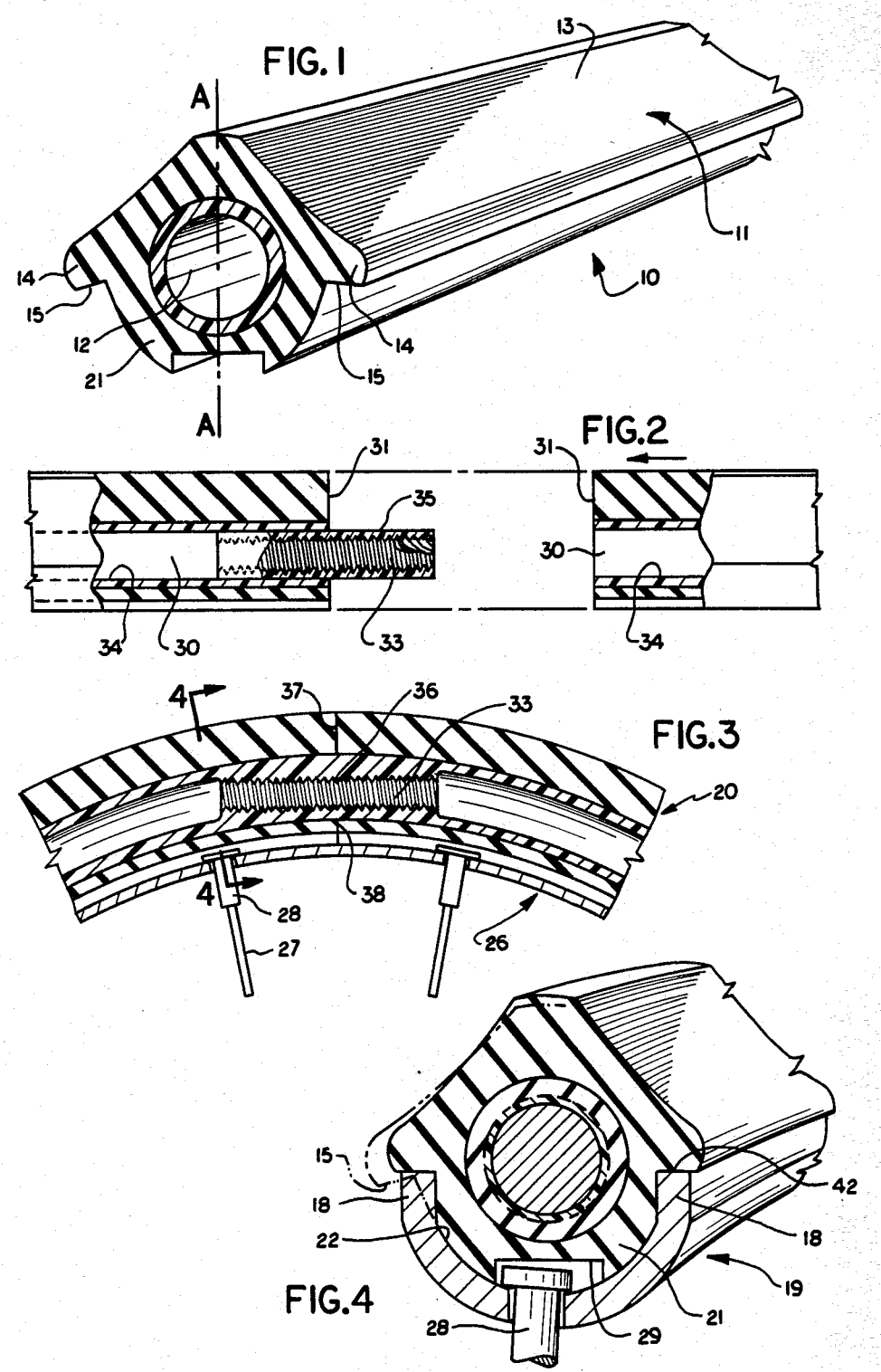

TIRE FOR WHEELCHAIRS AND THE LIKE

BACKGROUND OF THE INVENTION

It is known that a non-pneumatic tire may be made by first forming a length of tire stock material and joining the ends together in such a manner as to provide a continuous tire, as described in U.S. Pat. No. 1,622,546, granted to G. W. Sieberling on Mar. 29, 1927, and in U.S. Pat. No. 4,033,395, granted to W. M. Berg et al. on July 5, 1977.

The Berg et al. patent describes a tire made from a continuous length of extruded thermoplastic material which is cut and adjoined at its ends to form a completed tire. Thermoplastic material has also been used to form cast non-pneumatic tires as taught by R. J. Wyman in U.S. Pat. No. 4,127,166, issued Nov. 28, 1978.

A serious deficiency of many non-pneumatic tires is in the hardness of ride provided by these tires. The Berg et al. patent attempts to overcome this deficiency by providing an inner chamber which is filled with a liquid urethane resin which reacts to form a solid tire. The Wyman patent, on the other hand, teaches that a softer ride may result if a non-pneumatic tire encloses an air chamber, such chamber being defined by the cross-sectional area of the cast tire and the cross-sectional area of the wheel rim to which the tire is attached, the tire being cemented in place to trap the air thus enclosed.

In both the Wyman and Berg et al. patents, however, the chamber so provided affords no structural integrity to the tire. Thus, in the Wyman patent, radial deforming forces applied to the tire cause pronounced collapse of the tire material into the chamber and the resiliency of ride offered by the material of the tire is compromised by the deformability of the tire body into the chamber. In the Berg et al. patent, the inner chamber is filled with urethane, which is substantially softer, and therefore less rigid, than the material of the outer tire.

What is desirable then, and is the object of the present invention, is to provide in a non-pneumatic tire means to impart structural integrity to the tire, but in such manner as the resiliency and ride of the tire may be controlled by appropriate changes in material of construction and configuration of the main tire body.

A further object of the present invention is to provide for the manufacture of such tire in a continuous extrusion process whereby costs of manufacture are minimized and process time is similarly minimized.

A further object of the present invention is to provide means for joining extruded tire stock material to form a completed tire in such a manner that the ends of the tire material are securely and irreversibly joined into a finished tire.

SUMMARY OF THE INVENTION

The invention provides a non-pneumatic tire construction for wheelchairs, bicycles, and the like formed from an extruded length of composite tire stock which is cut and joined at its ends, the tire stock being a composite of an elastomeric casing and a semirigid, thermoplastic, hollow core. The elastomeric material of the tire casing is characterized by a relatively low compressive modulus giving the tire superior rollability, cushioning and traction slightly better than natural rubber, superior wear properties, and light weight. The tire core is formed of a relatively stiff, inextensible, creep-resistant, thermoplastic material which affords dimensional stability to the tire and gives a soft ride. In a preferred manner of construction, the tire casing is formed by extruding it over the core so that these elements are intimately bonded together along their full length. The tire has sufficient elasticity to enable it to be circumferentially stretched over and snapped onto a rim having a concave periphery and the joint has sufficient strength to sustain this stretching action. The tire is dimensioned with an interference fit on the circumference of the wheel so that contraction or springback of the tire when fully mounted on a rim is such as to retain the tire on the rim against sidewise forces tending to roll it off the rim or forces tending to counter-rotate it on the rim. Where, as disclosed, the wheel rim is concave on its outer periphery, the core is disposed well within the rim cavity to improve retention of the tire on the rim against roll-off.

As further disclosed, the end faces of the tire stock are joined to form a continuous band. In accordance with another aspect of the invention, the ends are joined by inserting a short plug in the core and thermally fusing it to the inner surfaces of the core. Heat for this fusion process is developed on the surface of the plug within the center of the tire body by induction heating, while the surrounding area of the tire body is largely unaffected. The preferred core structure is a round tube which conveniently accepts a plug in the form of a round threaded short length of steel coated with the same material as the core and sized to fit into its ends. The hollow structure of the core also contributes to the desirable relatively light weight of the disclosed tire.

BRIEF DESCRIPTION OF THE DRAWINGS

FIG. 1 is a perspective, fragmentary view of a segment of a length of tire stock constructed in accordance with the invention;

FIG. 2 is a fragmentary view of opposite ends, partially in section, of a length of the tire stock in alignment for their assembly;

FIG. 3 is a cross-sectional, fragmentary view of an end joint of the tire mounted on a wheel taken on the central plane of the wheel;

FIG. 4 is a perspective, fragmentary view of the tire and wheel assembly taken along the lines 4—4 indicated in FIG. 3;

DESCRIPTION OF THE PREFERRED EMBODIMENTS

Figure 5:
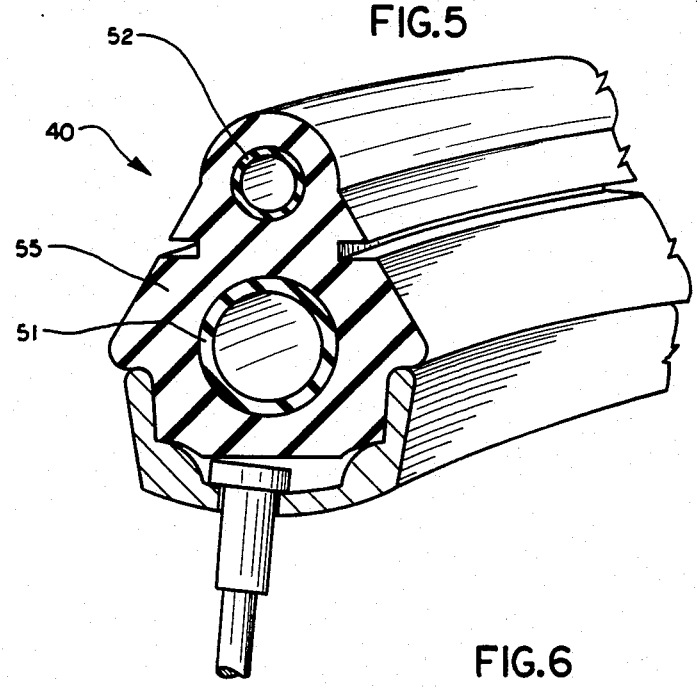
FIG. 5 is a fragmentary, perspective view of a second embodiment of the tire constructed in accordance with the invention.

Referring now to the drawings, and in particular to FIGS. 1-4, there is shown a tire construction 10 suitable for use on a wheel of an invalid wheelchair, a bicycle, or the like. Stock 10 for forming the tire comprises an outer casing or carcass 11 and an inner core or tube 12. The casing 11 is an elastomeric material, such as a blend of thermoplastic elastomer olefins of both the block and graft copolymer type, having a durometer range of 60 through 95 Shore A. The elastomeric polymer for the casing should have a low specific gravity, low rolling friction, superior wear properties, low compression set, and suitable traction, and should not leave tracks or mars on floors when used for wheelchairs. The core 12 is preferably a semirigid, thermoplastic, polymeric material such as gas phase, low density polyethylene with a mineral fiber reinforcement loading of about 15% for improved mechanical properties, particularly creep resistance. The illustrated core 12 has the cross section of a round tube of medium wall thickness in the order of one-eighth of its outside diameter. The polymer for the core 12 should be relatively stiff, inextensible, and creep-resistant to provide dimensional stability to the tire. It must be elastic enough, however, to enable the tire to be stretched over and snapped onto the rim of the wheel upon which the tire is to be mounted.

The casing 11 surrounds the core and has a cross section which is symmetrical about a vertical axis A—A (FIG. 1) through the center of the extruded section. In the embodiment of FIGS. 1 through 4, an upper or radially outer portion 13 (FIG. 1) of the casing 11 forms the tire thread portion. Laterally extending portions 14 of the casing 11 provide at their under sides shoulder surfaces 15 adapted to seat on the axially spaced flanges 18 of a spoke wheel rim 19 (FIG. 4). A lower or radially inner area 21 of the casing 11 is adapted to seat on the outer peripheral surface 22 of the rim 19. As shown, this outer surface 22, with reference to the periphery of the rim 19, is concave so as to form an annular cavity or pocket for receiving the radially inner area 21 of the casing 11. The rim 19 is of generally conventional construction, and can be formed of steel, aluminum, magnesium, or suitable rigid plastic materials. A wheel 26, of which the rim 19 is a part, includes conventional angularly spaced spokes 27 emanating from a hub (not shown) and secured to the rim by spoke screws 28 disposed in suitable holes in the wall of the rim. A continuous slot 29 (FIG. 4) is provided in the inward face of the casing portion 21 to give a degree of clearance for the heads of the spoke screws 28.

Tire stock 10 according to the invention is preferably made by extruding the casing 11 over the core 12. It will be understood that the die through which the casing material is extruded has essentially the same profile as the finished exterior shape of the casing 11. The core 12, which is also preferably extruded, can be produced concurrently with its use in the formation of the casing 11, or can be made and stored in bulk reels prior to formation of the casing on it. Techniques for either concurrently coextruding or cross-extruding the core 12 on the casing 11 or extruding the casing over a prefabricated core are known in the art. It has been found that the casing 11 can be extruded directly over the core 12 without resort to special surface preparation or adhesive coatings on the core while achieving a strong intimate bond of the casing on the core. Where the casing material 11 is extruded at elevated temperatures, subsequent cooling and thermal contraction of the casing contribute to the bonding lock of the casing on the core 12.

As mentioned above, the core 12 is a semirigid, inelastic material, at least as compared to the casing 11, which has a substantially lower compressive modulus than the core. As a result, the body of the casing 11 lends a high degree of cushioning and shock absorbing capacity to the tire. At the same time, a degree of compliance and radial deformation is afforded by the hollow core 12, which can resiliently deflect out of its illustrated circular cross section. The relative contribution to cushioning and compression made by the core 12 can be altered to suit the particular service of the tire 10 by modifying its relative size, configuration, and position within the casing 11. The stiffness of the core material permits the core 12 to dimensionally stabilize the relatively soft casing material, thereby prohibiting the latter from undue stretching or creeping under long-term service.

In order to make a tire, a measured length of tire tread stock 10, comprising the core 12 and casing 11, can be cut as it is received from the extruder, or can be cut subsequently from reels of such extruded stock. The cut-off length of tread stock 10 is formed into a continuous loop and the ends 31 are abutted and permanently joined together. To do this, a threaded steel plug 33, which is coated with a layer 35 (FIG. 2) of thermoplastic material which is the same as the material of the core 12 or is at least melt-compatible with it, is inserted about half-way into one of the bores 30 (FIG. 2) of the core. Subsequently, the opposite end of the tread stock is joined to the first end and the other half of the plug 33 is inserted into the other bore 30. With the end faces 31 firmly held together by appropriate means such as a clamping fixture, the zone of the plug 33 is exposed to a high frequency alternating magnetic field so as to heat the plug by induction heating. The intensity and time period of the exposure to the alternating magnetic field are enough to substantially and transiently fuse the coating 35 to the inner surface 34 of the core 12. Typical cycle time is 20–30 seconds.

Preferably, sufficient heat is provided from the plug 33 to fuse the core 12 across the plane of the abutted end faces 36 thereof (FIG. 3). It will thus be understood that the joint in the finished product includes fusion of the original core material across the plane of the end joint 36 as well as fusion of any material 35 originally covering the plug 33 to the surrounding inner surfaces 34 of the core 12.

The elastomeric material of the casing 11 is not fused together, so that there is an outer circumferential juncture 37 and an inner juncture 38 in the casing at the abutting end faces 31 of the tire stock 10 (FIG. 3).

The plug or coupling insert 33 is formed with a rough or irregular surface so as to grip and adhere to the coating 35. Knurling may be used instead of threads as shown. The surface of steel plugs may be provided with a phosphate coating. There should be enough material around the plug to hold the ends of the tread stock 31 together even though the ends 36 of the core may not be fused together. For a 24-inch diameter tire with a width across the casing shoulders 14 of approximately 1 1/16 inch, a plug of about 1½ inches long, with 20 threads to the inch, is sufficient. The plug may be curved, if desired, to conform to the shape of the tire. Preferably from about 5 to 20 parts of a tackifier is added to the coating 35 to help it adhere to the inner surface 34 of the core 12. In order to save weight, the plug insert 33 can be hollow instead of solid.

The plug and/or its coating must be ferromagnetic so that when subjected to an alternating magnetic field, enough transient heat is generated to make a thermal or fusion bond with the core 12. We contemplate that the plug could be aluminum or nylon with ridges or threads coated with linear polyethylene or other suitable plastic which is filled with gamma $Fe_2O_3$ or $Fe_3O_4$ or $CrO_3$ or other metallic oxides or materials which are ferromagnetic susceptors. When used as fillers for these purposes, these materials are preferably reduced to submicron particle size, for example, 0.01 microns. A typical maximum particle size is 20 microns. These materials and their uses are well known in the art.

The alternating magnetic field provided by induction heating ranges in frequency from 450 kilohertz (0.45 megahertz) to 5000 megahertz. It is important that the field provide enough heat energy in a short time to fuse the coating and bond it to the core without liquefying and heating too much adjacent material. If the coating is fused for too long a period of time, it tends to liquefy and run out of the joint. It is thus important that the induction heating cycle be relatively intense and transient and not extend over too long a period of time. Again, these techniques are well known to those skilled in the art.

Once the ends of the tread stock 31 have been joined together as described and a tire 20 formed, the tire is stretched over the rim flanges 18 so that the inner portion 21 of the casing 11 can be snapped over or disposed into the annular rim cavity formed between these flanges against the surface 22 which defines that cavity. The residual tension force maintained by the core 12 reliably keeps the tire on the rim by resisting forces tending to roll it off the rim or cause it to counter-rotate on the rim. When the tire is snapped over the rim, it is stretched about 2%. As indicated in FIG. 4, a substantial portion of the core 12 is radially within the cavity of the rim 19, i.e., inward of the radially outer extremities of the rim. This construction improves the resistance of the tire 20 to rolling sideways off the rim 19 under lateral loads, since such movement would require considerable stretching of the relatively stiff core 12 over the flange 18 of the rim.

It will be noted by a comparison of FIG. 1 and FIG. 4 that the shoulder or bead surfaces 15 in cross section are originally formed in lines which make a large dihedral angle to each other but are pressed or squeezed inwardly when on the tire rim so as to be on the same line. The original dihedral configuration is indicated in FIG. 4 at the dotted line. The residual tension in the tire 20, when snapped over and mounted on the rim 19, causes the outer faces 42 of the flanges 18 to bear against the bead surfaces 15 and cause the latter to distort from the original dihedral angle generally to a common cylindrical plane concentric with the axis of the wheel. This distortion of the shoulder beads 14 assures that the tire 20 will remain tightly fitted on the rim 19 without the risk of lateral shifting or rolling off of the rim. It will be understood that the strength of the joint formed by the material thermally fused about the plug 33 and the plug 45 itself is sufficiently strong to sustain the required stretching of the tire when being mounted on the rim 19 and to sustain the residual stresses in the tire once it is mounted on the rim.

The described feature of generating heat from within the tread stock 10, and more specifically within the core 12, is especially suited for use where the casing material 11 is not particularly susceptible to thermal fusing in terms of strength and reliability, or where the casing might suffer degradation at temperatures required to thermally fuse the core material or the material 35 covering the plug 33. It should be appreciated that the plug 33, in addition to providing a means for internally heating the tire for thermally fusing adjacent material at the joint, also contributes to the strength of the joint by distributing tensile forces along portions of the tire ends to reduce the level of shear forces and tensile forces in the tire body. It can also be understood that the plug 33 simplifies registration of the end faces 31 of the tire when it is disposed in both ends thereof.

The polymeric materials disclosed above when used to make the tire casing 11 and core 12 afford substantial savings in weight over prior natural rubber constructions. The hollow structure of the core 12 likewise contributes to this desirable reduction in weight. A 24-inch diameter natural rubber wheelchair tire made with a retaining wire weighed 43 ounces whereas a tire made with a solid threaded steel insert and the described polymers weighed 17.6 ounces.

The specific gravity of the polymers for both the casing 11 and core 12 should preferably be less than 1. The preferred polymer for the casing has a cross link density of at least 10% for suitable physical properties. A suitable material is Shell Elexar thermoplastic elastomer No. 8431Z, manufactured by Shell Chemical Co. This is a polypropylenebased thermoplastic rubber. It may be blended with Royalene EPDM polymers, such as Royalene 528, manufactured by Uniroyal Chemical. These are high performance terpolymers of ethylene, propylene, and diene.

Another suitable material for the casing 11 is a thermoplastic elastomer olefin cured to, for example, at least 50% cross link density by a post-extrusion curing process. Still another suitable material is a two-part thermoset urethane in the durometer range of 60–80 Shore A hardness. Other elastomeric materials of which the casing can be formed include thermoplastic urethane elastomers with a skin for smooth, aesthetic appearance and a cellular, internal body for advantages in weight, cost, and related properties. The compressive modulus and modulus of elasticity of the casing material are substantially less than that of core 12.

A suitable material for the inner core 12 is Union Carbide G-Resin 7441, which is a fractional melt index, low density polyethylene manufactured by Union Carbide Corporation. This should be filled with mineral fibers or glass fibers in the order of 8–25%, and preferably about 15%, by weight in order to minimize creep and stretch resistance.

The Secant modulus of elasticity of this resin material, unfilled, in psi at 1% elongation is 34,000. We have characterized this material as semirigid. It has sufficient stiffness and resistance to creep and elongation to retain the shape of the tire throughout the period of normal service. It stretches just enough to let the tire be snapped over the rim. The maximum stretch should be in the order of 5%. When snapped over a rim, the tire is stretched about 2%.

Figure 6:
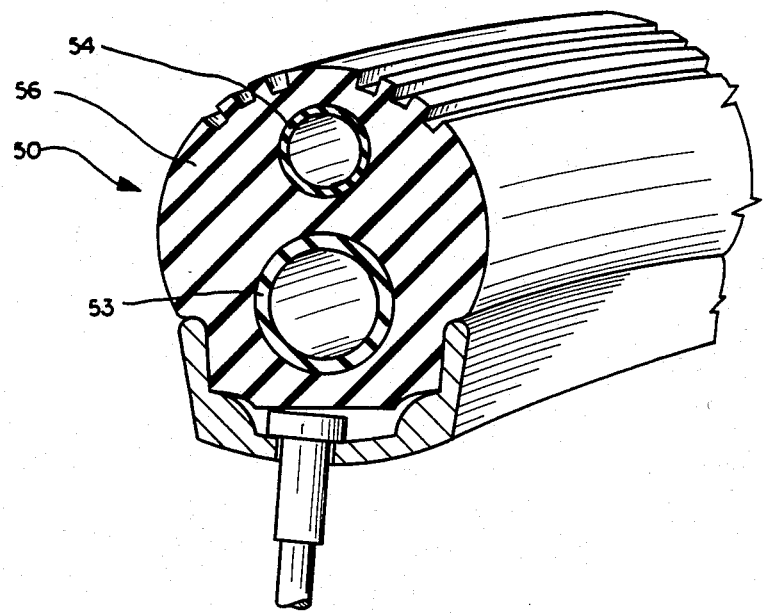
FIG. 6 is a fragmentary, perspective view of still another embodiment of the tire constructed in accordance with the invention.

FIGS. 5 and 6 show alternative embodiments of the tire construction in accordance with the invention. In these embodiments, tread stocks 40 and 50 are provided with separate core elements 51, 52, 53 and 54. As described above, the related casings 55 and 56 are extruded over the core elements. In these embodiments of FIGS. 5 and 6, the ride of the tire can be varied and controlled by the sizes of the core elements, the shapes of the casings, and the width of the on-the-road tread. A narrow tread and wide base as shown in FIG. 4 are preferred for wheelchair tires. The hollow core elements contribute to weight savings. In the embodiments of FIGS. 5 and 6, one or both of the core elements may be provided with plugs analogous to the insert 33 for purposes of joining the ends of the tire stock into a continuous band to make a tire.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A method of making a tire for a wheelchair or the like, comprising the steps of extruding an elastomeric casing of relatively low modulus of elasticity over a semirigid, thermoplastic, creep-resistant hollow core of relatively high modulus of elasticity, cutting the extruded casing and core to the circumferential length of the tire, positioning a ferromagnetic insert in opposite ends of the core, said insert being coated with a thermoplastic elastomer which is fuse-compatible with the elastomer of the core, abutting the ends of the casing and core, exposing the zone of the ferromagnetic insert to high frequency electromagnetic radiation to inductively heat the surfaces of the insert and generate sufficient heat to thermally fuse the material in the vicinity of the insert to the inside surfaces of the core to effectuate a permanent coupling of the ends of the tire whereby the core provides the major resistance to hoop stress in the tire.

2. A method as set forth in claim 1, wherein said core is extruded in a tubular configuration and said insert is inserted into each end of the core for a distance at least equal to the major transverse dimension of the bore of the core.